United States Patent
Hickenbottom

(10) Patent No.: US 7,604,066 B2
(45) Date of Patent: Oct. 20, 2009

(54) MULTIPURPOSE REAR GROOMING ASSEMBLY FOR A VEHICLE AND METHOD OF STORAGE OF MULTIPLE GROOMING ASSEMBLIES THEREWITH

(75) Inventor: Ronald Joe Hickenbottom, Sullivan, IL (US)

(73) Assignee: Agri-Fab, Inc., Sullivan, IL (US)

( * ) Notice: Subject to any disclaimer, the term of this patent is extended or adjusted under 35 U.S.C. 154(b) by 0 days.

(21) Appl. No.: 12/054,161

(22) Filed: Mar. 24, 2008

(65) Prior Publication Data

US 2009/0236107 A1 Sep. 24, 2009

(51) Int. Cl.
*A01B 45/02* (2006.01)
(52) U.S. Cl. .................................... 172/21; 172/540
(58) Field of Classification Search .............. 56/6, 56/7, 249, 294, 15.4, 15.5, 15.6; 172/21, 172/22, 41, 42, 452, 397, 799.5, 540; 37/301, 37/195, 466, 403–410
See application file for complete search history.

(56) References Cited

U.S. PATENT DOCUMENTS

| | | | |
|---|---|---|---|
| 343,063 A | 6/1886 | Plumb | |
| 2,770,894 A | 11/1956 | Gettleman | |
| 2,987,018 A * | 6/1961 | Vath | 111/8 |
| 3,241,173 A | 3/1966 | Finn | |
| 4,090,457 A * | 5/1978 | Roberts | 111/82 |
| 4,179,828 A * | 12/1979 | Brunty | 37/241 |
| 4,802,536 A | 2/1989 | O'Neal | |
| 5,197,211 A | 3/1993 | Haug | |
| 6,058,687 A * | 5/2000 | Short | 56/7 |
| 6,286,608 B1 * | 9/2001 | Fowble, III | 172/675 |
| 6,394,737 B1 | 5/2002 | Griffin | |
| 6,422,321 B1 | 7/2002 | Dillon | |
| 6,643,959 B2 | 11/2003 | Julliff et al. | |
| 6,644,416 B2 | 11/2003 | Teeple | |
| 6,659,191 B1 | 12/2003 | Humphrey | |
| 6,874,307 B2 | 4/2005 | Reincke | |
| 7,163,067 B2 | 1/2007 | Job | |
| 2004/0007402 A1 | 1/2004 | Kujawa | |
| 2006/0236670 A1 | 10/2006 | Glasford et al. | |
| 2008/0000651 A1 | 1/2008 | Bowsher | |

FOREIGN PATENT DOCUMENTS

| | | |
|---|---|---|
| EP | 1688541 | 8/2006 |
| GB | 776765 | 6/1957 |
| GB | 916632 | 1/1963 |
| GB | 1181734 | 2/1970 |
| GB | 2170390 | 8/1986 |

OTHER PUBLICATIONS

European Patent Office, European Search Report, Application No. EP 09 15 3767, Jun. 17, 2009, Munich.

* cited by examiner

*Primary Examiner*—Robert E Pezzuto
(74) *Attorney, Agent, or Firm*—Vedder Price P.C.

(57) ABSTRACT

A multipurpose rear grooming assembly for a lawn garden vehicle, and more specifically, to a rear grooming assembly capable of use as a spike aerator, a plug aerator, a dethatcher, or even a roller where the grooming assembly also serves as storage for two or more implements. The grooming assembly includes a universal frame with implements when in the operating position and to accommodate more than one of the plurality of lawn-grooming implements, much like a protective rack, when the universal frame is oriented vertically in a storage configuration.

12 Claims, 5 Drawing Sheets

MULTIPURPOSE REAR GROOMING ASSEMBLY FOR A VEHICLE AND METHOD OF STORAGE OF MULTIPLE GROOMING ASSEMBLIES THEREWITH

FIELD OF THE INVENTION

This disclosure relates to a multipurpose rear grooming assembly for a lawn and garden vehicle, and more specifically, to a rear grooming assembly capable of use as a spike aerator, a plug aerator, a dethatcher, or even a roller, where the grooming assembly also serves as storage for two or more of implements.

BACKGROUND

In rural and urban environments, lawns and other outdoor surfaces often require care. Weather conditions and extraneous uses can compact, damage, or upturn surfaces; branches or thatch can accumulate over parts of the surface; rocks can resurface over time; and dead branches, twigs, or man-made debris can collect over parts of the surface. Different tools exist in the marketplace to care for these surfaces. This disclosure relates generally to these devices and their methods of use.

Understandably, if a small surface requires care, or a great degree of precision in the work is required, handheld devices may be best suited. For intermediately sized parcels, devices can be attached to small, portable frames moved over the ground by a walking operator by pushing or pulling a handlebar. In some cases, portable frames can include motors to aid with movement over the surfaces, such as classical lawnmowers. For larger parcels, grooming assemblies can be connected to a large vehicle via a tongue. These vehicles can range from small tractors, when private yards are treated, to large agricultural tractors, when, for instance, brush must be cut from the side of a highway. This disclosure relates specifically to grooming apparatuses that are attached to the rear of a vehicle.

Different types of implements exist to care for the above-described external surfaces. U.S. Pat. No. 7,073,317 is directed to a dethatcher designed to remove and collect undesirable small ground cover debris known as thatch. U.S. Pat. No. D550,252 is directed to a plug aerator capable of removing small plugs from the surface to benefit natural and artificial water circulation below a surface that has been compacted. U.S. Pat. Nos. D519,529 and 7,063,165 are directed to a spike aerator designed to create aeration veins between compacted zones of a surface to stimulate plant growth. These four patents, owned by the assignee in interest of the present application, are illustrative of different grooming assemblies in the marketplace. These patents are hereby incorporated fully by reference. Rollers and other implements are also used to compact surfaces that have been damaged and are uneven.

With these grooming assemblies, each has a frame that can be mounted to the rear of a vehicle for transportation and use over a surface. One known method of controlling the level of contact with the ground by the different implements of the grooming assemblies is to design the equipment with variable weight. Weight is added to force the implements into or onto the ground, and the weight is removed to aid with the transportation and storage of the grooming assemblies. These assemblies can also include a frame with a guardrail to hold a dead weight while in operating mode and a handle and movable wheel or wheels to raise the frame away from the ground while in transporting mode.

One of the main problems with these often heavy grooming assemblies is their size and the need for individual storage space in a warehouse, a garage, a shed, or the like for each of the plurality of grooming assemblies. Some implements are designed to break a surface and may have sharp edges or spikes, which may be a hazard when they are not stored flat against the ground. Presently, an operator who needs to compact a surface, remove thatch, and/or aerate an area must purchase and store a plurality of heavy and bulky pieces of equipment. What is needed is a grooming assembly capable of addressing the issues of storage and need for a plurality of implements without adversely affecting grooming capacity of the overall system.

SUMMARY

This disclosure relates to a multipurpose rear grooming assembly for a lawn and garden vehicle, and more specifically, to a rear grooming assembly capable of use as a spike aerator, a plug aerator, a dethatcher, or even a roller, where the grooming assembly also serves as storage for two or more implements. The grooming assembly includes a universal frame with mounting portions designed to accommodate any one of a plurality of lawn-grooming implements when in the operating position and to accommodate more than one of the plurality of lawn-grooming implements, much like a protective rack, when the universal frame is lifted off vertically in a transporting or storage position.

BRIEF DESCRIPTION OF THE DRAWINGS

Certain embodiments are shown in the drawings. However, it is understood that the present disclosure is not limited to the arrangements and instrumentality shown in the attached drawings.

DETAILED DESCRIPTION

Figure 1:
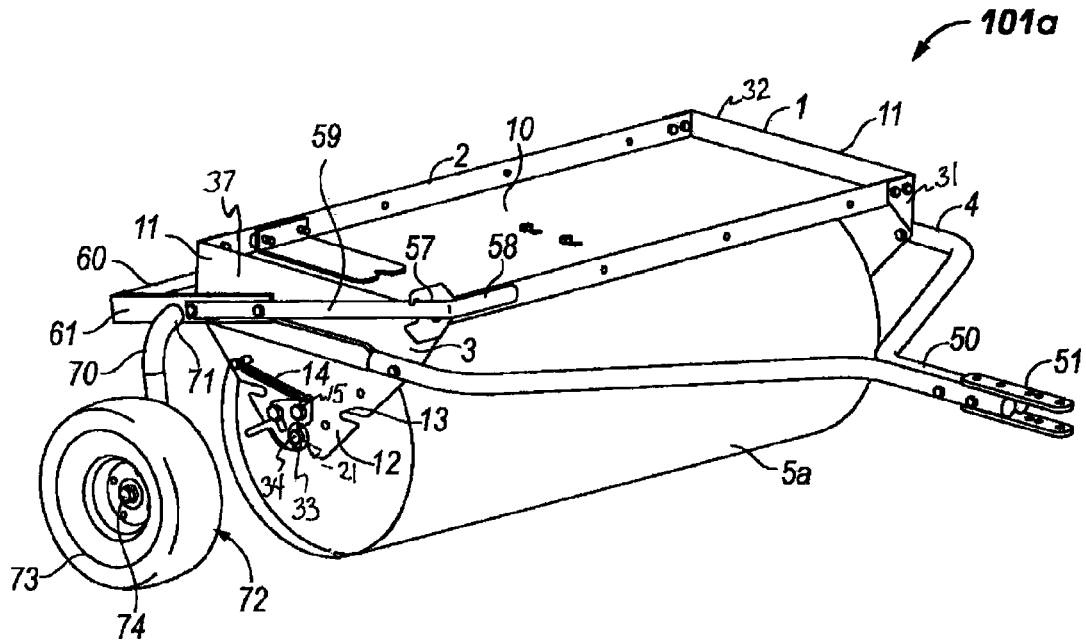
FIG. 1 is a perspective view of the multipurpose rear grooming assembly for a vehicle with a roller in a functional orientation according to an embodiment of the present disclosure.

For the purposes of promoting and understanding the principles disclosed herein, reference is now made to the preferred embodiments illustrated in the drawings, and specific language is used to describe the same. It is nevertheless understood that no limitation of the scope of the invention is hereby intended. Such alterations and further modifications of the illustrated devices and such further applications of the principles disclosed and illustrated herein are contemplated as would normally occur to one skilled in the art to which this disclosure relates.

Each of FIGS. 1-4 illustrates a multipurpose rear grooming assembly 101a, 101b, 101c, 101d for a vehicle (not shown) equipped with, respectively, a roller implement 5a, a dethatcher implement 5b, a plug aerator implement 5c, and a spike aerator implement 5d. These multipurpose grooming assemblies 101a-d are shown in a functional orientation positioned flat over the ground (not shown) according to four different embodiments of the present disclosure. While four different types of implements 5a-d are shown attached to the frame 1, the use within the multipurpose rear grooming assembly 101a-d of any lawn garden implement know in the art and that remains functional if placed within the universal frame 1 is contemplated.

The multipurpose lawn-grooming assembly 101a-d includes a universal frame 1 made of a main body 2, a support assembly 3, and a tongue 4. The main body 2 in a preferred embodiment as shown in FIGS. 1-4 is made of thin, metal plates bolted, shaped, and welded to form the main body 2. In one embodiment, the main body 2 includes a central portion 10 and a mounting portion 11 disposed at each longitudinally opposed end of the central portion 10. Each mounting portion 11 extends from the central portion 10 and is secured to the central portion 10 by a small, reinforced cornice 31, thus creating a C-shaped main body 2 made of thin metal plates.

In a preferred embodiment, thin steel plates are protected from debris, shocks, and scratches by a surface finish such as partial corrosion, paint, or stainless steel or other rust-proof metal. The main body 2, where applicable, can be reinforced using ribs (not shown), corners, or plates to support the weight to be placed into the central portion 10 and prevent deformation of the central portion 10 and/or the main body 2. A guardrail 32 is shown disposed around the central portion 10 and adjacent to the mounting portions 11 to reinforce the main body 2 and to hold any weights (not shown) placed over the central portion 10 of the main body 2 during operation of the grooming assembly 101. During use, the grooming assembly 101 is subject to shocks and bumps when moved over the ground. While the use of a guardrail 32 is shown, the use of fixed weights attached to the central portion 10 or variable weights (such as a water tank) to hold weights in the universal frame 1 is also contemplated.

The support assembly 3 of the grooming assembly 101 further includes a crossbar 60 and a ground-engaging element 72. The support assembly 3 is connected to the frame 1 for relative movement with respect thereto. In a contemplated configuration, the support assembly 3 is rotationally connected to the frame 1 using a pivot and an arm 59 equipped with a gripping handle 58. The handle 58 of the arm 59 can be bent past a tab 57 connected to the frame 1 to lock the support assembly 3 in place relative to the universal frame 1. In a preferred embodiment, the tab 57 is connected to the guardrail 32. If the handle 58 is pushed into the locked position as shown in FIGS. 1-4 and the tab 57 is engaged, the ground-engaging element 72 shown as two wheels with pneumatic tires 73 contacts the ground and lifts the frame 1 a distant from the ground. When the support assembly is locked in place in the lifted configuration as shown in FIGS. 1-4, the selected grooming implement 5a-d may no longer make contact with the ground so long as the tongue 4 of the frame is held horizontally and attached to a vehicle (not shown).

Figure 5:
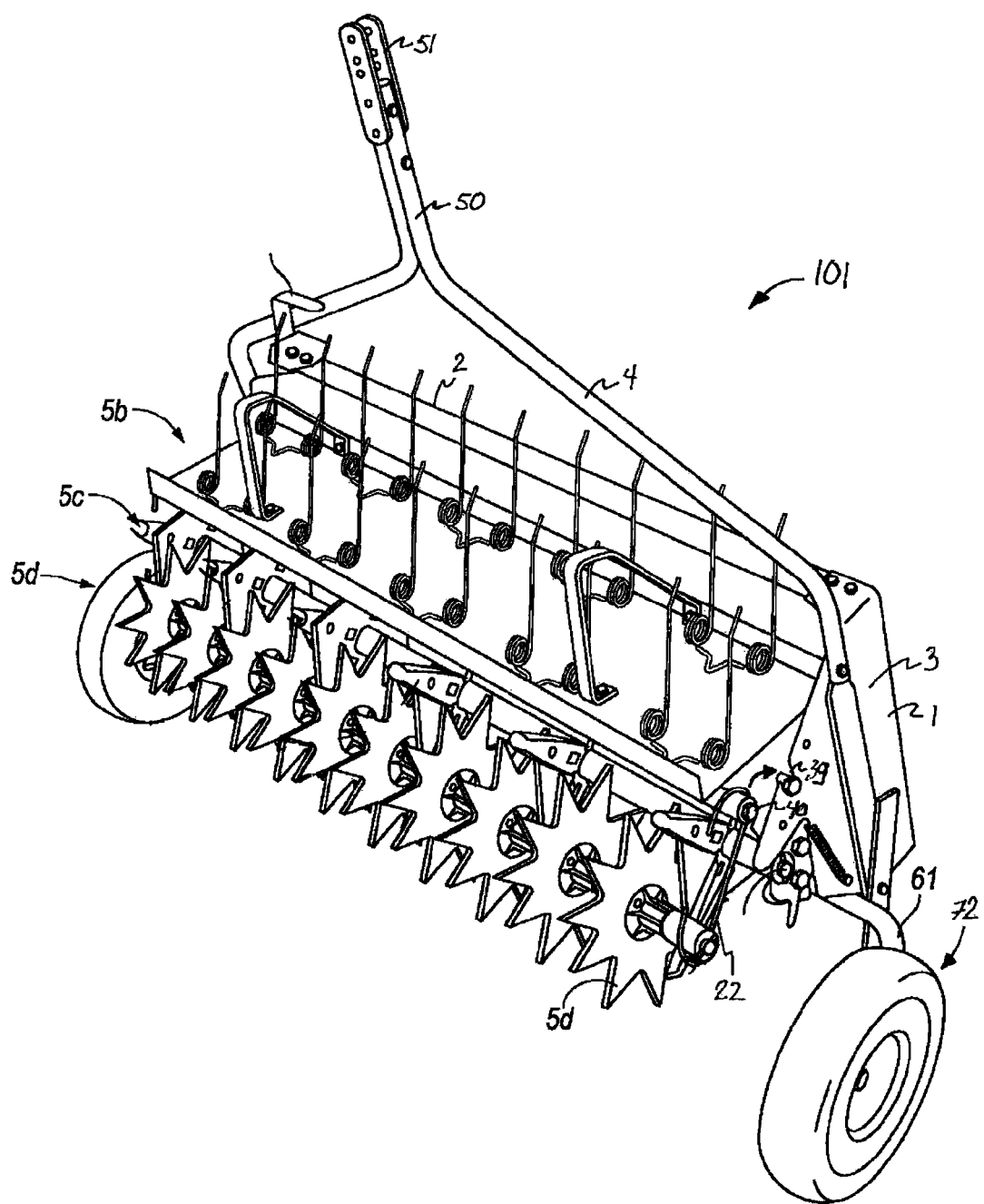
FIG. 5 is a perspective view of the multipurpose rear grooming assembly of FIG. 1 in a storage configuration where the spike aerator grooming implement, the dethatcher grooming implement, and the plug aerator grooming implement are stored together in the grooming assembly according to another embodiment of the present disclosure.

In an alternate embodiment, the support assembly 3 includes an arm 59 connected to each longitudinally opposed end of the crossbar 60 and to one of the mounting portions 37. In another embodiment, the support assembly 3 further includes a handle 58 connected to one of the arms 59 and extending therefrom for selective engagement with a lock or a tab 57 that secures the support assembly 3 in a storage orientation as shown in FIG. 5. The use of a leg connected to each arm 59 and extending from the leg and the ground-engaging element is movably connected to the leg proximate a distal end of the leg such as at the crossbar 60 is also contemplated.

In a preferred embodiment, the wheels 73 are connected to the support assembly 3 via fixation arms 70. The arms 70 include a first bend 71 connected to the support 3 and a second bend (hidden) connected via a pivot 74 to the wheel 73. The crossbar 60 as shown in FIG. 5 is fixed to the frame at two sharp corners, both at right angles. While one possible mechanical design of the ground-engaging element 72, the support assembly 3, and the frame 1 is shown, other mechanical structures capable of the same functions, using similar means, and operating in similar ways are also contemplated.

FIG. 5 shows the grooming assembly 101 in the storage configuration resting generally vertically against a wall (not shown). In this configuration, the tongue 4 is disposed generally vertically along the wall and the crossbar 60 and ground-engaging element, such as the wheels 73, are rested contiguous with the ground to protect the frame 1 from contact with the ground. To be stable in the storage configuration, at least two parts of the grooming assembly 101 must rest against a support. As shown in FIG. 5, the ground-engaging element 72 and the crossbar 60 rest at two locations against the ground, and alternatively, the guardrail 32 gently rests against a back wall. In a preferred embodiment, for the distance between the crossbar 60 and the ground-engaging element 72 to be fixed and thus bring stability to the grooming assembly, the handle 58 must be in the locked position. Storage of the grooming assembly 101 where the crossbar 60 is locked against the frame 1 and placed against the ground while the guardrail 32 is pushed against a back wall is also contemplated.

Returning to FIGS. 1-4, the tongue 4 includes a tow bar 50 connected to the frame at one end and extending from the main body 2 at a distal end to facilitate operative connection to a tow vehicle (not shown). In one embodiment, the connector is two connection plates 51. Other types of vehicle connection are contemplated, such as a ball and hitch and the like.

Figure 2:
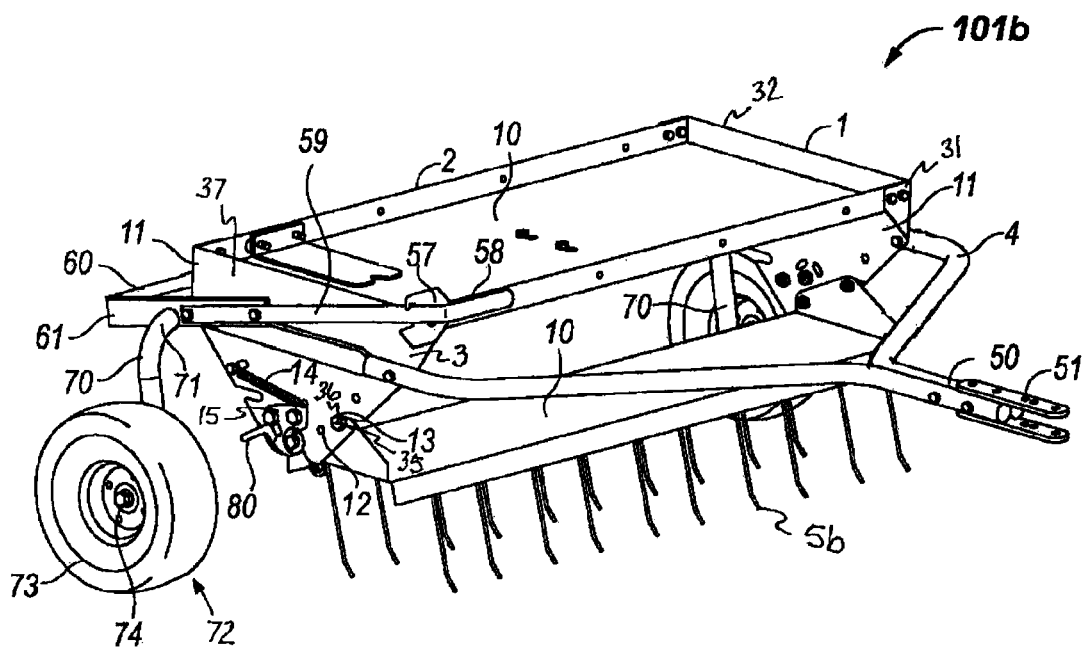
FIG. 2 is a perspective view of the multipurpose rear grooming assembly of FIG. 1 equipped with a dethatcher in a functional orientation according to another embodiment of the present disclosure.
Figure 3:
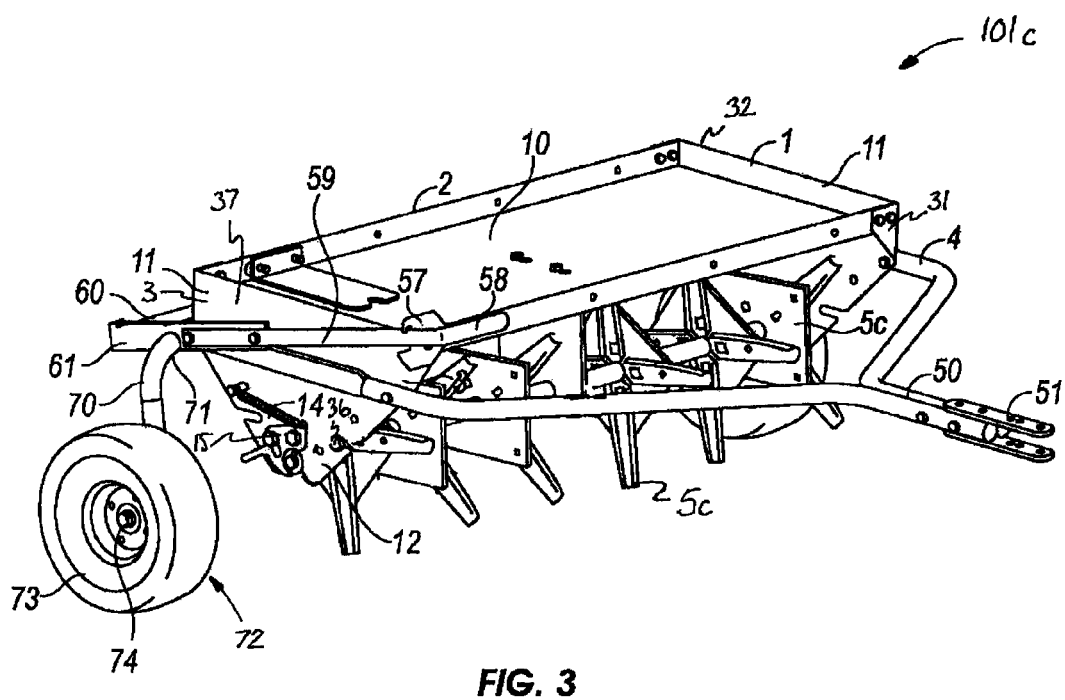
FIG. 3 is a perspective view of the multipurpose rear grooming assembly of FIG. 1 equipped with a plug aerator in a functional orientation according to another embodiment of the present disclosure.
Figure 4:
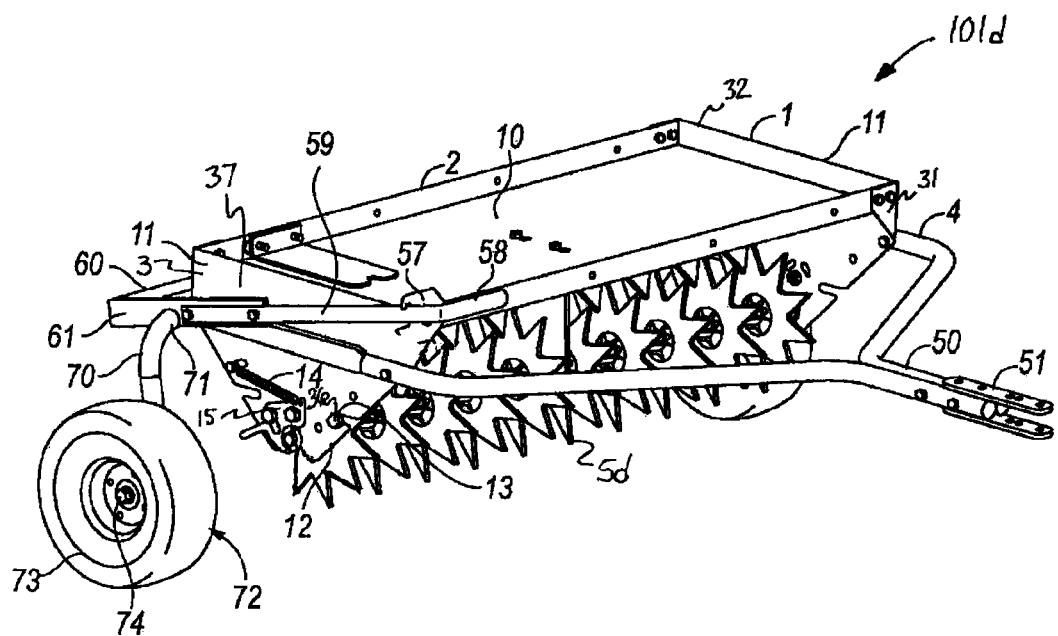
FIG. 4 is a perspective view of the multipurpose rear grooming assembly of FIG. 1 equipped with a spike aerator in a functional orientation according to another embodiment of the present disclosure.

The lawn-grooming implements 5a-d are in turn each configured for tool-less connection to the frame 1. For example, as shown in FIG. 1, an axis 33 with an end bolt 34 at the center of the roller 5a allows for coupling the implement 5a to a coupling assembly 12 on the support assembly 3. FIGS. 2-4 show an implement 5b-d where a support axis 35 and a bolt 36 are used as the tool-less male connection. The coupling assembly 12 includes a slot 13 defined in the mounting portion 37 with an open end at a distal extent of the mounting portion 37 and a latch 15 having a slot 21 and a biasing element 14.

What is shown is a slot 13 where the support axis 35 of the tool-less male connector is slid, in the case of a device as shown with two opposite mounting portions 37, onto two different coupling assemblies 12 located at opposite ends of the frame 1 and where a long implement 5a-d with end support axis 35 is slid into the slots 13. To lock the implement 5a-d to the mounting portion 37, a plate, such as a latch 15, rotating and held in place by the biasing element 14, is then pushed aside using a lever 80 revealing the latch slot 21 for the insertion of the male connector. In a preferred embodiment, the coupling assembly 37 is normally biased in a closed position and must be pushed open during changes in implements 5a-d. Once the male connector is inserted in the slot 13, the lever 80 is released and the latch 15 rotates back under the force created in the biasing element 14 such as a coil linear spring to connect the latch slot 21 with the male connector.

The use of any other locking mechanism located on the mounting portions 37 for a tool-less male connector as found on the implements 5a-d is also contemplated. In another embodiment, each of the plurality of lawn-grooming implements 5a-d further includes a mounting bearing (not shown) disposed thereon for cooperative registration with the slot 13 and the latch slot 21. While a bearing can facilitate the rotation or angular movement of the implement 5a-d within the mounting portion 37, what is also contemplated is the use of grease, lubricant, mounting bearings, or friction surfaces to facilitate the cooperative registration.

FIG. 5 shows how the plurality of lawn-grooming implements 5b-d can each be separately connectable to the frame 1 by selective engagement with the coupling assembly 12 and all collectively connectable to the frame 1. For example, when the lawn-grooming implements 5b-d are in storage orientation, they are not required to be held in their operational location and their connectors can be inserted into slots made for the sole purpose of storing a lawn-grooming implement 5a-d. The precise location and orientation of the different latches on the coupling assembly 12 can be at different positions based on the different requirements of the lawn-grooming implements 5a-d.

Figure 6:
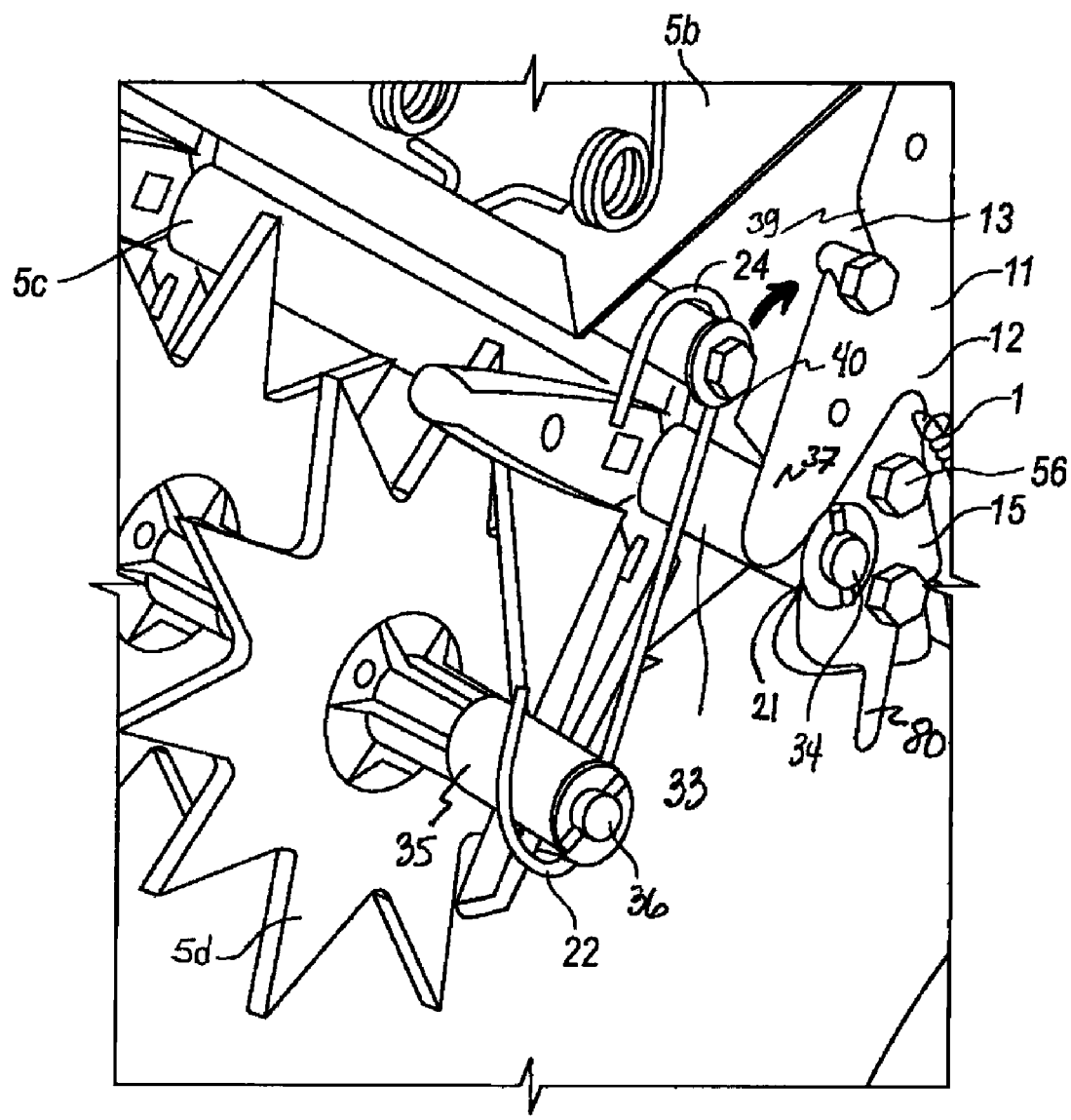
FIG. 6 is a close-up view of the frame of the multipurpose rear grooming assembly in the storage configuration as shown in FIG. 5.

In an alternate embodiment, the mounting portion 37 includes additional slots 39, 40 to facilitate connection of one of the plurality of lawn-grooming implements to the frame when the tongue 4 is disposed in the storage configuration as shown in FIG. 5. In yet another embodiment, hooks 22 with rounded ends 24 to be attached in the slot 40 as shown by the arrow and shown in greater detail in FIG. 6 connect one of the plurality of lawn-grooming implements 5c to the frame 1 when the tongue 4 is disposed in the storage configuration.

Finally, the multipurpose lawn-grooming assembly 101 described above has novel functionality resulting in the ability of a user to implement a novel method of use thereof. While one method is described, what is contemplated is the implementation of this method and all equivalents thereof.

Figure 7:
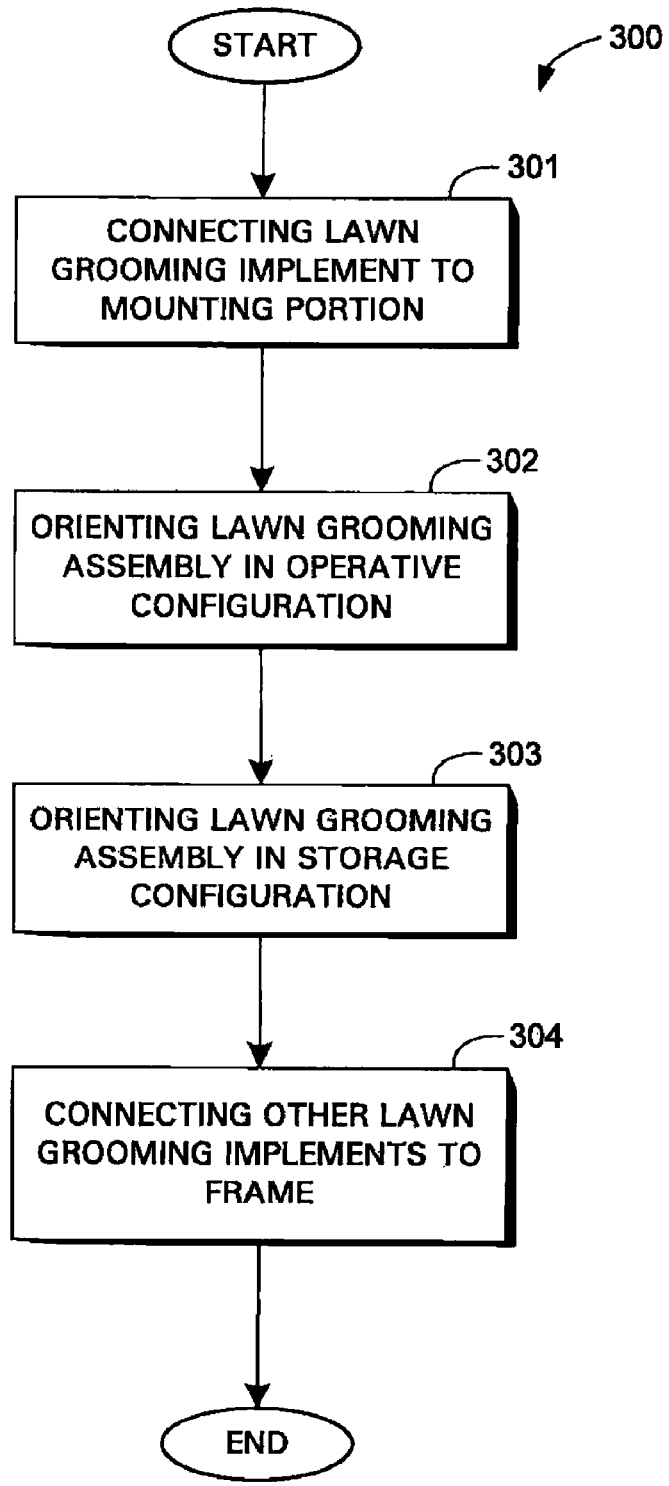
FIG. 7 is a diagram of the method of storing multiple grooming assemblies within the multipurpose rear grooming assembly.

FIG. 7 shows a method 300 of using a multipurpose lawn-grooming assembly for operation and storage of a plurality of lawn-grooming implements 101. The method comprises the steps of selectively and tool-lessly connecting 301 one of the plurality of lawn-grooming implements 5a-d to a mounting portion 37 of a main body 2 of a frame 1 of the multipurpose lawn-grooming assembly 101 by actuating a coupling assembly 12 so that a mounting bearing (not shown) disposed on one of the plurality of lawn-grooming implements 5a-d is in cooperative registration with a mounting portion slot 12 and a latch slot 21. Then, orienting 302 the multipurpose lawn-grooming assembly 101 in an operative configuration as shown in FIGS. 1-5, which is defined when a tongue 4 connected to the frame 1 is disposed generally horizontally. Next, orienting 302 the multipurpose lawn-grooming assembly 101 in a storage configuration shown in FIG. 5 when the tongue 4 is disposed generally vertically and a crossbar 60 and ground-engaging element 72 of a support assembly 3 that is connected to the frame 1 for relative movement with respect thereto are contiguous with a ground surface (not shown). Finally, connecting 304 others of the plurality of lawn-grooming implements 5a-d to the frame 1.

It is understood that the preceding is merely a detailed description of some examples and embodiments of the present invention and that numerous changes to the disclosed embodiments can be made in accordance with the disclosure made herein without departing from the spirit or scope of the invention. The preceding description, therefore, is not meant to limit the scope of the invention but to provide sufficient disclosure to one of ordinary skill in the art to practice the invention without undue burden.

What is claimed is:

1. A multipurpose lawn-grooming assembly comprising:
   a universal frame comprising a main body, support assembly, and tongue;
   a plurality of different lawn-grooming implements, each configured for tool-less connection to the frame;
   the main body including a central portion and a mounting portion disposed at each longitudinally opposed end of the central portion, each mounting portion extending likewise from the central portion and including a coupling assembly having a slot defined in the mounting portion with an open end at a distal end of the mounting portion and a latch having a latch slot and a biasing element;
   the support assembly including a crossbar and a ground-engaging element, the support assembly connected to the frame for relative movement with respect thereto;
   the tongue including a tow bar connected to the frame that extends from the main body, the tongue being adapted to facilitate operative connection to a tow vehicle;
   the plurality of different lawn-grooming implements each separately connectable to the frame by selective engagement with the coupling assembly and all collectively connectable to the frame when the tongue is disposed in a storage configuration, which is defined when the tongue and the main body is disposed generally vertically and the crossbar and ground-engaging element are contiguous with a ground surface, and wherein only a single of the lit of different lawn-grooming implements is connected to the frame when the tongue is disposed in an operative configuration.

2. The assembly as recited in claim 1, wherein each of the plurality of lawn-grooming implements further includes a mounting bearing disposed thereon for cooperative registration with the mounting portion slot and the latch slot.

3. The assembly as recited in claim 1, wherein the mounting portion includes additional slots to facilitate connection of one of the plurality of lawn-grooming implements to the frame when the tongue is disposed in the storage configuration.

4. The assembly as recited in claim 1, wherein hooks connect one of the plurality of lawn-grooming implements to the frame when the tongue is disposed in the storage configuration.

5. The assembly as recited in claim 1, wherein the support assembly includes an arm connected to each longitudinally opposed end of the crossbar and to one of the mounting portions.

6. The assembly as recited in claim 5, wherein the support assembly further includes a handle connected to one of the arms and extending therefrom for selective engagement with a lock that secures the support assembly in a storage orientation.

7. The assembly as recited in claim 1, wherein a leg is connected to each arm and extends from the leg and the ground-engaging element is movably connected to the leg proximate a distal end of the leg.

8. The assembly as recited in claim 1, wherein the ground-engaging element is a wheel and pneumatic tire assembly.

9. The assembly as recited in claim 1, wherein the plurality of lawn-grooming implements is selected from the group consisting of a roller, an aerator, and a dethatcher.

10. The assembly as recited in claim 1, wherein the coupling assembly further includes a biasing element and a lever to facilitate movement of the latch against the biasing element such that one of the plurality of lawn-grooming implements in selective engagement with the coupling assembly is selectively disengaged and replaced with another of the plurality of lawn-grooming implements.

11. The assembly as recited in claim 1, wherein the coupling assembly is normally biased in a closed position.

12. A method of using a multipurpose lawn-grooming assembly for operation and storage of a plurality of different lawn-grooming implements comprising:
   selectively and tool-lessly connecting one of the plurality of different lawn-grooming implements to a mounting portion of a main body of a frame of the multipurpose lawn-grooming assembly by actuating a coupling assembly so that a mounting bearing disposed on one of the plurality of lawn-grooming implements is in cooperative registration with a mounting portion slot and a latch slot;
   orienting the multipurpose lawn-grooming assembly in an operative configuration, which is defined when a tongue connected to the frame is disposed generally horizontally;
   orienting the multipurpose lawn-grooming assembly in a storage configuration when the tongue and the main body are disposed generally vertically and a crossbar and ground-engaging element of a support assembly that is connected to the frame for relative movement with respect thereto are contiguous with a ground surface; and
   connecting at least two of the plurality of different lawn-grooming implements to the frame.

* * * * *